(12) United States Patent
Xiao et al.

(10) Patent No.: US 8,848,308 B2
(45) Date of Patent: Sep. 30, 2014

(54) SYSTEMS AND METHODS FOR ADC SAMPLE BASED INTER-TRACK INTERFERENCE COMPENSATION

(71) Applicant: LSI Corporation, San Jose, CA (US)

(72) Inventors: Jun Xiao, Fremont, CA (US); Fan Zhang, Milpitas, CA (US); George Mathew, San Jose, CA (US); Erich F. Haratsch, Bethlehem, PA (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 13/784,448

(22) Filed: Mar. 4, 2013

(65) Prior Publication Data

US 2014/0247514 A1  Sep. 4, 2014

(51) Int. Cl.
*G11B 5/035* (2006.01)
*G11B 20/10* (2006.01)

(52) U.S. Cl.
CPC ............................... *G11B 20/10046* (2013.01)
USPC .......................................................... 360/65

(58) Field of Classification Search
None
See application file for complete search history.

(56) References Cited

U.S. PATENT DOCUMENTS

| | | | |
|---|---|---|---|
| 4,495,528 A * | 1/1985 | Sasamura et al. | 360/40 |
| 5,057,945 A * | 10/1991 | Shimada et al. | 360/22 |
| 6,038,372 A * | 3/2000 | Jeon | 386/273 |
| 6,055,119 A * | 4/2000 | Lee | 360/51 |
| 6,600,794 B1 * | 7/2003 | Agarossi et al. | 375/341 |
| 6,836,456 B2 * | 12/2004 | Tonami | 369/59.22 |
| 6,909,566 B1 * | 6/2005 | Zaitsu et al. | 360/31 |
| 7,349,321 B2 * | 3/2008 | Kudo et al. | 369/124.03 |
| 7,733,592 B2 * | 6/2010 | Hutchins et al. | 360/51 |
| 7,982,994 B1 * | 7/2011 | Erden et al. | 360/55 |
| 8,250,434 B2 | 8/2012 | Yang | |
| 8,537,482 B1 * | 9/2013 | Song et al. | 360/39 |
| 2002/0012306 A1 * | 1/2002 | Hayami et al. | 369/59.21 |
| 2002/0018422 A1 * | 2/2002 | Tonami | 369/59.22 |
| 2007/0115574 A1 * | 5/2007 | Eleftheriou et al. | 360/39 |
| 2007/0177292 A1 * | 8/2007 | Bui et al. | 360/46 |
| 2009/0268575 A1 * | 10/2009 | Tan et al. | 369/53.41 |
| 2011/0041028 A1 * | 2/2011 | Liu et al. | 714/752 |
| 2011/0103527 A1 * | 5/2011 | Liu et al. | 375/341 |
| 2012/0063022 A1 | 3/2012 | Mathew | |
| 2012/0063024 A1 | 3/2012 | Mathew | |
| 2012/0063284 A1 * | 3/2012 | Mathew et al. | 369/53.44 |
| 2013/0021689 A1 | 1/2013 | Haratsch | |
| 2013/0083418 A1 * | 4/2013 | Worrell et al. | 360/45 |
| 2013/0286498 A1 * | 10/2013 | Haratsch et al. | 360/45 |

OTHER PUBLICATIONS

Gibson et al "Directions for Shingled-Write and Two-Dimensional Magnetic Recording System" Architectures: Synergies with Solid-State Disks Carnegie Mellon Univ. May 1, 2009.
U.S. Appl. No. 13/705,116, filed Dec. 4, 2012, George Mathew, Unpublished.
U.S. Appl. No. 13/618,317, filed Sep. 14, 2012, Jun Xiao, Unpublished.
Wu, et al., "Equation Based LDPC Decoder for Intersymbol Interference Channels" 2005 IEEE International Conf. on Acoustics, Speech, and Signal Processing vol. 5 Mar. 2005.

* cited by examiner

*Primary Examiner* — Peter Vincent Agustin
(74) *Attorney, Agent, or Firm* — Hamilton DeSanctis & Cha (57) ABSTRACT

Various embodiments of the present invention provide systems and methods for mitigating inter-track interference using pre-equalized data samples.

20 Claims, 7 Drawing Sheets

SYSTEMS AND METHODS FOR ADC SAMPLE BASED INTER-TRACK INTERFERENCE COMPENSATION

FIELD OF THE INVENTION

The present inventions are related to systems and methods for data processing, and more particularly to systems and methods for mitigating interference in information accessed from a storage medium.

BACKGROUND OF THE INVENTION

In developing data storage systems, there is a desire to put as much information in possible per unit area. The density of information capable of storage per unit area is limited by an ability to later sense and recover that information. As density increases, the amount of interference between distinct portions of the information stored on the storage medium generally increases. This increase in interference often leads to recovery errors, and thus is a significant limit on increasing the density of storage.

Hence, for at least the aforementioned reasons, there exists a need in the art for advanced systems and methods for inter-track interference compensation.

BRIEF SUMMARY OF THE INVENTION

The present inventions are related to systems and methods for data processing, and more particularly to systems and methods for mitigating interference in information accessed from a storage medium.

Various embodiments of the present invention provide data processing systems that include: an analog to digital converter circuit, an inter-track interference compensation circuit, and an equalizer circuit. The analog to digital converter circuit is operable to convert an input data to a series of digital samples. The input data corresponds to a first region on a storage medium. The inter-track interference compensation circuit is operable to reduce inter-track interference in a data input to yield a corrected output. The data is derived from the series of digital samples, and the inter-track interference corresponds at least in part to a second region on the storage medium. The equalizer circuit is operable to equalize the corrected output to yield an equalized output.

This summary provides only a general outline of some embodiments of the invention. The phrases "in one embodiment," "according to one embodiment," "in various embodiments", "in one or more embodiments", "in particular embodiments" and the like generally mean the particular feature, structure, or characteristic following the phrase is included in at least one embodiment of the present invention, and may be included in more than one embodiment of the present invention. Importantly, such phases do not necessarily refer to the same embodiment. Many other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

FIG. 1b depicts an existing track to track to track data layout of data on the storage medium of FIG. 1a;

DETAILED DESCRIPTION OF THE INVENTION

The present inventions are related to systems and methods for data processing, and more particularly to systems and methods for mitigating interference in information accessed from a storage medium.

Various embodiments of the present invention provide data processing systems that include: an analog to digital converter circuit, an inter-track interference compensation circuit, and an equalizer circuit. The analog to digital converter circuit is operable to convert an input data to a series of digital samples. The input data corresponds to a first region on a storage medium. The inter-track interference compensation circuit is operable to reduce inter-track interference in a data input to yield a corrected output. The data is derived from the series of digital samples, and the inter-track interference corresponds at least in part to a second region on the storage medium. The equalizer circuit is operable to equalize the corrected output to yield an equalized output.

In some instances of the aforementioned embodiments, the data processing system further includes: a data detector circuit and a data decoder circuit. The data detector circuit is operable to apply a data detection algorithm to a data detector input derived from the equalized output to yield a detected output. The data decoder circuit is operable to apply a data decode algorithm to a decoder input to yield a decoded output. In some cases, the data processing system further includes: a timing recovery circuit operable to phase shift the equalized output to yield a phase shifted output, and a selector circuit operable to select one of the equalized output or the phase shifted output as the data detector input.

In one or more instances of the aforementioned embodiments, the data processing system further includes: a sample buffer operable to store the digital samples as buffered samples, and a selector circuit operable to select one of the digital samples or the buffered samples to be provided as the data input. In particular instances of the aforementioned embodiments, the data processing systems further include a sample control circuit operable to adjust a sampling clock based upon the digital samples to yield an updated sampling clock when a retry mode is selected. The updated sampling clock controls sampling by the analog to digital converter circuit.

Other embodiments of the present invention provide methods for data processing that include: receiving an analog input corresponding to a first region of a storage medium; converting the analog input into a series of digital samples using an analog to digital converter circuit; reducing an interference in a data input to yield a corrected output, wherein the data input is derived from the series of digital samples, and equalizing the corrected output to yield an equalized output. The inter-track interference corresponds at least in part to information from a second region on the storage medium; and In some instances of the aforementioned embodiments, the methods further include: applying a data detection algorithm to a data detector input derived from the equalized output to yield a detected output; and applying a data decode algorithm to a decoder input to yield a decoded output, wherein the decoder input is derived from the detected output. In some such cases, the methods may further include: interpolating the equalized output to correct a phase error to yield a phase adjusted output; selecting the equalized output as the data detector input when a standard mode is operating; and selecting the phase adjusted output as the data detector input when a retry mode is operating.

In various instances of the aforementioned embodiments, the methods further include: adjusting a sampling clock based upon the digital samples to yield an updated sampling clock when a retry mode is selected. The updated sampling clock controls sampling of the analog input when converting the analog input into the series of digital samples. In some instances of the aforementioned embodiments, the methods further include: buffering the digital samples to yield buffered samples; selecting the digital samples as the data input when a standard mode is operating; and selecting the buffered samples as the data input when a retry mode is operating.

Figure 1A:
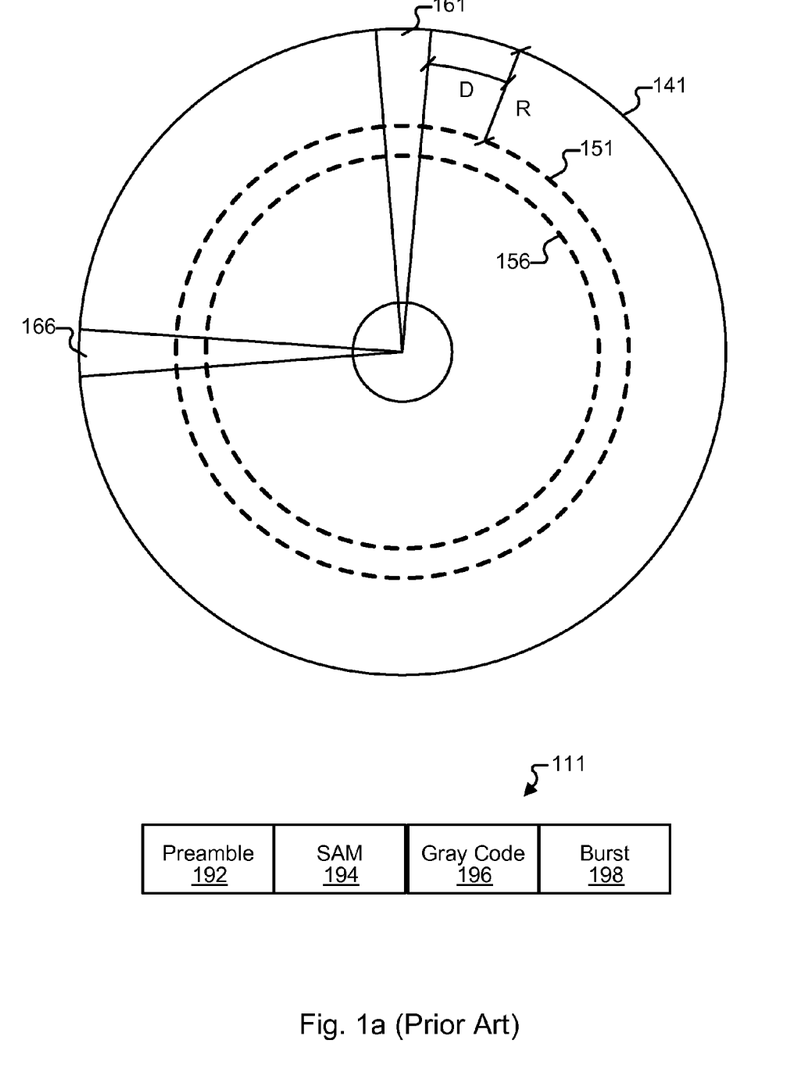
FIG. 1a depicts an existing storage medium including servo data.

Turning to FIG. 1a, data storage systems often store data arranged in tracks. FIG. 1a shows a storage medium 101 with two exemplary tracks 151, 156 indicated as dashed lines. The tracks are segregated by servo data written within wedges 161, 166 (i.e., servo wedges). These wedges include data and supporting bit patterns 111 that are used for control and synchronization of the read/write head assembly over a desired location on storage medium 101. In particular, these wedges generally include a preamble pattern 192 followed by a sector address mark 194 (SAM). Sector address mark 194 is followed by a Gray code 196, and Gray code 196 is followed by burst information 198. It should be noted that while two tracks and two wedges are shown, hundreds of each would typically be included on a given storage medium. User data is stored at bit period locations between successive servo wedges.

Figure 1B:
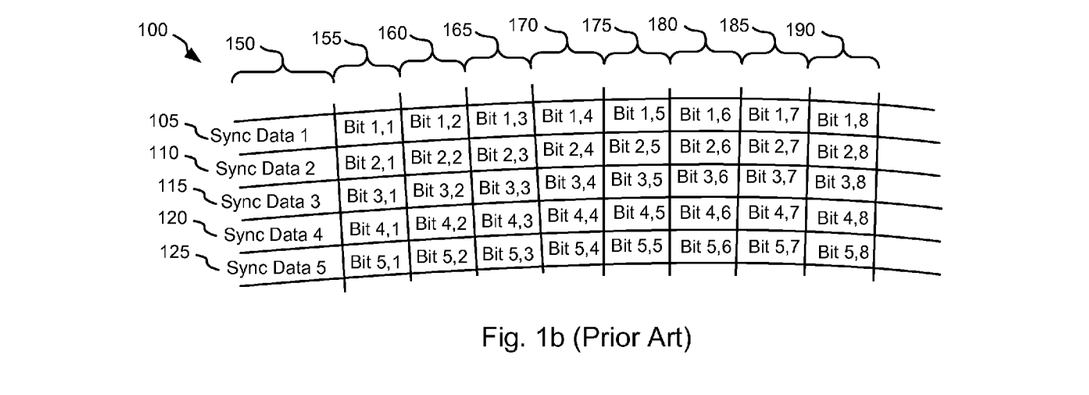

FIG. 1b shows an existing track to track layout 100 of data on storage medium 101. Of note, track to track layout 100 includes only some of the data across some of the tracks that would be expected on an existing storage medium. As shown, layout 100 includes a number of tracks 105, 110, 115, 120, 125. Each of the tracks includes a synchronization pattern 150 (i.e., sync data 1, sync data 2, sync data 3, sync data 4, sync data 5) followed by bit periods of user data 155, 160, 165, 170, 175, 180, 185, 190. The bit periods each include magnetic information corresponding to data for a given bit period. As the density of the bit periods increase, magnetic information from one bit period will interfere or be combined with magnetic information from surrounding bit periods. This includes interaction from bit periods in one track with bit periods in prior and subsequent tracks. Failure to properly account for inter-track interference results in diminished accuracy of recovered data bits.

Some embodiments of the present invention provide for inter-track interference cancellation on a pre-equalized data set. Such an approach generates a corrected signal that thereby reduces the possibility of mis-equalization. However, in some cases, there is not time to perform ADC sample based sampling clock recovery during on the fly processing, but rather the raw samples are used. In such cases, interpolative timing recovery is performed in the digital domain. In other cases such as a retry mode where data processing is delayed and is processor bandwidth becomes available, such interpolative timing recovery may not be used. The retry mode occurs where a data set fails to converge, and is maintained for additional processing.

Figure 2:
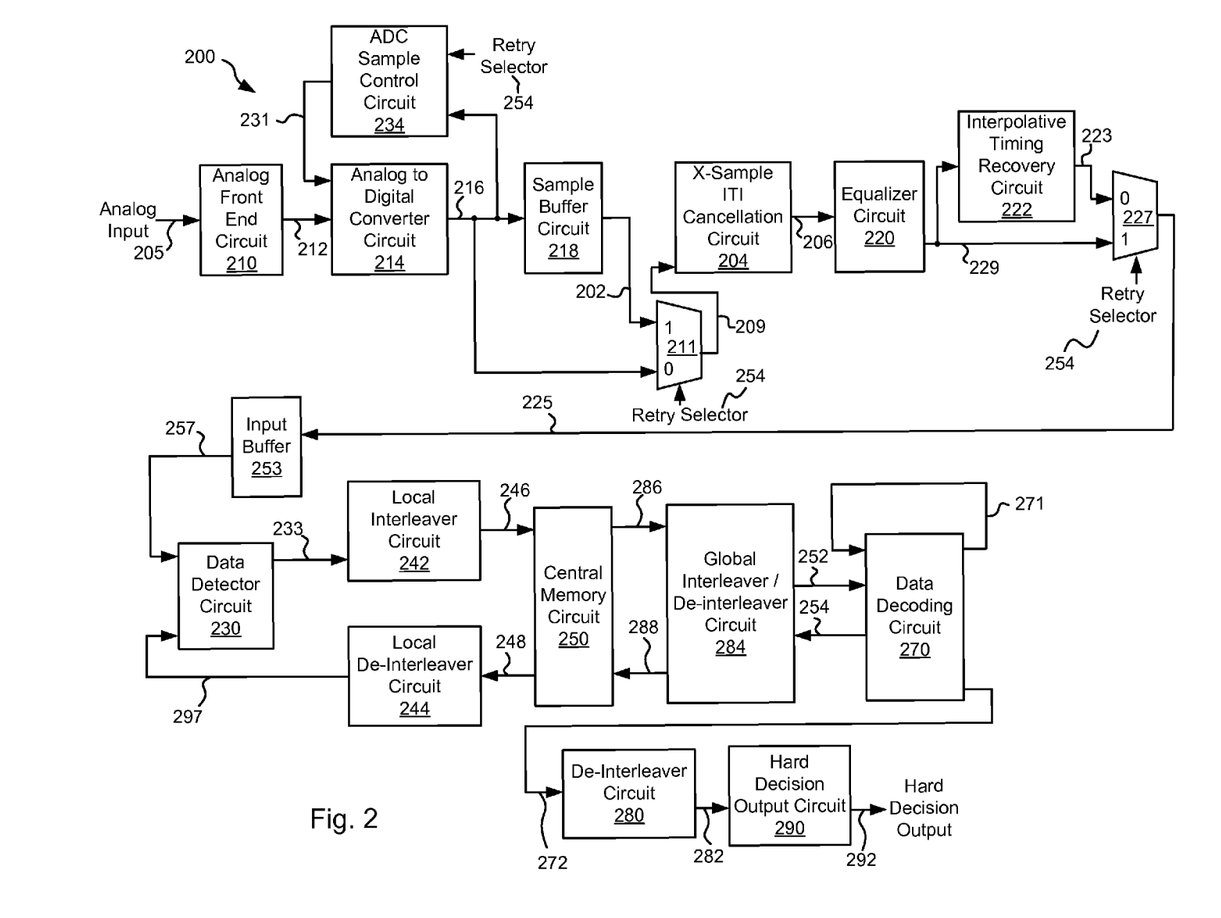
FIG. 2 depicts a data processing circuit including an X-sample based ITI cancellation circuit in accordance with various embodiments of the present invention.

Turning to FIG. 2, a data processing circuit 200 is shown that includes an X-sample based ITI cancellation circuit 204 in accordance with various embodiments of the present invention. Data processing circuit 200 includes an analog front end circuit 210 that receives an analog signal 205. Analog front end circuit 210 processes analog signal 205 and provides a processed analog signal 212 to an analog to digital converter circuit 214. Analog front end circuit 210 may include, but is not limited to, an analog filter and an amplifier circuit as are known in the art. Based upon the disclosure provided herein, one of ordinary skill in the art will recognize a variety of circuitry that may be included as part of analog front end circuit 210. In some cases, where data processing circuit 200 is implemented as part of a storage device, analog signal 205 is derived from a read/write head assembly (not shown) that is disposed in relation to a storage medium (not shown). Based upon the disclosure provided herein, one of ordinary skill in the art will recognize a variety of source from which analog input 205 may be derived.

Analog to digital converter circuit 214 converts processed analog signal 212 into a corresponding series of digital samples 216. Analog to digital converter circuit 214 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 216 are provided to a sample buffer circuit 218 where they are stored in the event a retry is desired (i.e., if a data set fails to converge on an initially processing). The buffered digital samples are available as a buffered output 202. In addition, digital samples 216 are provided to an ADC sample control circuit 234 that adjusts the phase and/or frequency of a sampling clock 231 used by analog to digital converter circuit 214 to sample analog signal 212. ADC sample control circuit 234 may be any circuit known in the art for adjusting the phase and/or frequency of a sampling clock. In some cases, ADC sample control circuit 234 includes a digital finite impulse response filter that filters digital samples 216 to yield a filtered output. The filtered output is then provided to an error adjustment circuit that modifies the sampling clock. Based upon the disclosure provided herein, one of ordinary skill in the art will recognize a variety of implementations of ADC sample control circuit 234 that may be used in relation to different embodiments of the present invention. Further, digital samples 216 are provided to a selector circuit 211. Selector circuit 211 selects one of buffered output 202 or digital samples 216 to be provided as processing samples 209. The selection by selector circuit 211 is controlled by a retry selector 254 that is asserted as a logic '1' when retry processing is underway and as a logic '0' when standard processing is underway. In particular, selector circuit 211 provides buffered output 202 as processing samples 209 when retry processing is underway, and provide digital samples 216 as processing samples 209 when standard processing is underway.

The latency of generating digital samples 216 is reduced by disabling the update of sampling clock 231 by ADC sample control circuit 234 when standard processing is underway as indicated by retry selector 254. Thus, in the standard processing mode, digital samples 216 are somewhat asynchronous when compared with digital samples 216 that are generated when retry processing is underway and ADC Sample control circuit 234 is updating sampling clock 231. As will be discussed below, adjustment for out of phase sampling by analog to digital converter circuit 214 is done by an interpolative timing recovery circuit 222 operating in the digital domain.

Processing samples 209 (x[n]) are provided to an X-sample inter-track interference cancellation circuit 204 that reduces any inter-track interferences occurring in the received processing samples to yield a corrected output 206. In general, processing samples 209 provided to X-sample inter-track interference cancellation circuit 204 may be represented by the following equation (drop[ping the noise term):

$$x[n] = \sum_k a_0[n-k]g_0[k] + \sum_k a^-[n-k]g^-[k].$$

where $a_0$ is the hard decisions from the current track, $a^-$ is the signal from an adjacent track, $g_0$ is the analog to digital converter target for the current track, and $g^-$ is the analog to digital converter target for intertrack interference (ITI) from the adjacent track. Based upon a reasonable assumption that $a_0$ and $a^-$ are uncorrelated, the inter-track interference can be estimated by correlating x[n] with $a^-$ in accordance with the following equation:

$g^-[k]=E\{x[n]\cdot a^-[n-k]\}.$

The aforementioned estimated interference is subtracted from processing samples 209 to yield corrected output 206 ($\hat{x}[n]$) in accordance with the following equation:

$$\hat{x}[n] = x[n] - \sum_k a^-[n-k]g^-[k].$$

Corrected output 206 is provided to an equalizer circuit 220. Equalizer circuit 220 applies an equalization algorithm to corrected output 209 to yield an equalized output 229. In some embodiments of the present invention, equalizer circuit 220 is a digital finite impulse response filter (DFIR) circuit as are known in the art. Equalized output 229 is provided to interpolative timing recovery circuit 222 that interpolates between adjacent instances of equalized output 229 to correct for any phase error introduced by the asynchronous sampling applied by analog to digital converter circuit 214. Interpolative timing recovery circuit 222 may be any circuit known in the art that is capable of interpolating between adjacent signals to yield an output signal. Based upon the disclosure provided herein, one of ordinary skill in the art will recognize a variety of implementations of interpolative timing recovery circuits that may be used in relation to different embodiments of the present invention. Interpolative timing recovery circuit 222 provides an interpolated output as a phase corrected output 223.

Phase corrected output 223 and equalized output 229 are provided to a selector circuit 227. The selection by selector circuit 227 is controlled by retry selector 254. In particular, selector circuit 227 provides equalized output 229 as a processing input 225 when retry processing is underway, and provides phase corrected output 223 as processing input 225 when standard processing is underway. Processing input 225 is stored to an input buffer 211 that includes sufficient memory to maintain one or more codewords until processing of that codeword is completed through a data detector circuit 230 and a data decoding circuit 270 including, where warranted, multiple global iterations (i.e., passes through both data detector circuit 230 and data decoding circuit 270) and/or local iterations (i.e., passes through data decoding circuit 270 during a given global iteration). An output 257 is provided to data detector circuit 230.

Data detector circuit 230 may be a single data detector circuit or may be two or more data detector circuits operating in parallel on different codewords. Whether it is a single data detector circuit or a number of data detector circuits operating in parallel, data detector circuit 230 is operable to apply a data detection algorithm to a received codeword or data set. In some embodiments of the present invention, data detector circuit 230 is a Viterbi algorithm data detector circuit as are known in the art. In other embodiments of the present invention, data detector circuit 230 is a is a maximum a posteriori data detector circuit as are known in the art. Of note, the general phrases "Viterbi data detection algorithm" or "Viterbi algorithm data detector circuit" are used in their broadest sense to mean any Viterbi detection algorithm or Viterbi algorithm detector circuit or variations thereof including, but not limited to, bi-direction Viterbi detection algorithm or bi-direction Viterbi algorithm detector circuit. Also, the general phrases "maximum a posteriori data detection algorithm" or "maximum a posteriori data detector circuit" are used in their broadest sense to mean any maximum a posteriori detection algorithm or detector circuit or variations thereof including, but not limited to, simplified maximum a posteriori data detection algorithm and a max-log maximum a posteriori data detection algorithm, or corresponding detector circuits. Based upon the disclosure provided herein, one of ordinary skill in the art will recognize a variety of data detector circuits that may be used in relation to different embodiments of the present invention. In some cases, one data detector circuit included in data detector circuit 230 is used to apply the data detection algorithm to the received codeword for a first global iteration applied to the received codeword, and another data detector circuit included in data detector circuit 230 is operable apply the data detection algorithm to the received codeword guided by a decoded output accessed from a central memory circuit 250 on subsequent global iterations.

Upon completion of application of the data detection algorithm to the received codeword on the first global iteration, data detector circuit 230 provides a detector output 233. Detector output 233 includes soft data. As used herein, the phrase "soft data" is used in its broadest sense to mean reliability data with each instance of the reliability data indicating a likelihood that a corresponding bit position or group of bit positions has been correctly detected. In some embodiments of the present invention, the soft data or reliability data is log likelihood ratio data as is known in the art. Detected output 233 is provided to a local interleaver circuit 242. Local interleaver circuit 242 is operable to shuffle sub-portions (i.e., local chunks) of the data set included as detected output and provides an interleaved codeword 246 that is stored to central memory circuit 250. Interleaver circuit 242 may be any circuit known in the art that is capable of shuffling data sets to yield a re-arranged data set. Interleaved codeword 246 is stored to central memory circuit 250.

Once a data decoding circuit 270 is available, a previously stored interleaved codeword 246 is accessed from central memory circuit 250 as a stored codeword 286 and globally interleaved by a global interleaver/de-interleaver circuit 284.

Global interleaver/De-interleaver circuit 284 may be any circuit known in the art that is capable of globally rearranging codewords. Global interleaver/De-interleaver circuit 284 provides a decoder input 252 into data decoding circuit 270. In some embodiments of the present invention, the data decode algorithm is a low density parity check algorithm as are known in the art. Based upon the disclosure provided herein, one of ordinary skill in the art will recognize other decode algorithms that may be used in relation to different embodiments of the present invention. Data decoding circuit 270 applies a data decode algorithm to decoder input 252 to yield a decoded output 271.

Where the allowable number of local iterations completes without convergence of the codewords, the resulting decoded output is provided as a decoded output 254 back to central memory circuit 250 where it is stored awaiting another global iteration through a data detector circuit included in data detector circuit 230. Prior to storage of decoded output 254 to central memory circuit 250, decoded output 254 is globally de-interleaved to yield a globally de-interleaved output 288 that is stored to central memory circuit 250. The global de-interleaving reverses the global interleaving earlier applied to stored codeword 286 to yield decoder input 252. When a data detector circuit included in data detector circuit 230 becomes available, a previously stored de-interleaved output 248 accessed from central memory circuit 250 and locally de-interleaved by a de-interleaver circuit 244. De-interleaver circuit 244 re-arranges decoder output 248 to reverse the shuffling originally performed by interleaver circuit 242. A resulting de-interleaved output 297 is provided to data detector circuit 230 where it is used to guide subsequent detection of a corresponding data set previously received as processing input 225.

Alternatively, where the decoded output converges (i.e., yields the originally written data set), the resulting decoded output is provided as an output codeword 272 to a de-interleaver circuit 280. De-interleaver circuit 280 rearranges the data to reverse both the global and local interleaving applied to the data to yield a de-interleaved output 282. De-interleaved output 282 is provided to a hard decision output circuit 290. Hard decision output circuit 290 is operable to re-order data sets that may complete out of order back into their original order. The originally ordered data sets are then provided as a hard decision output 292.

Figure 3:
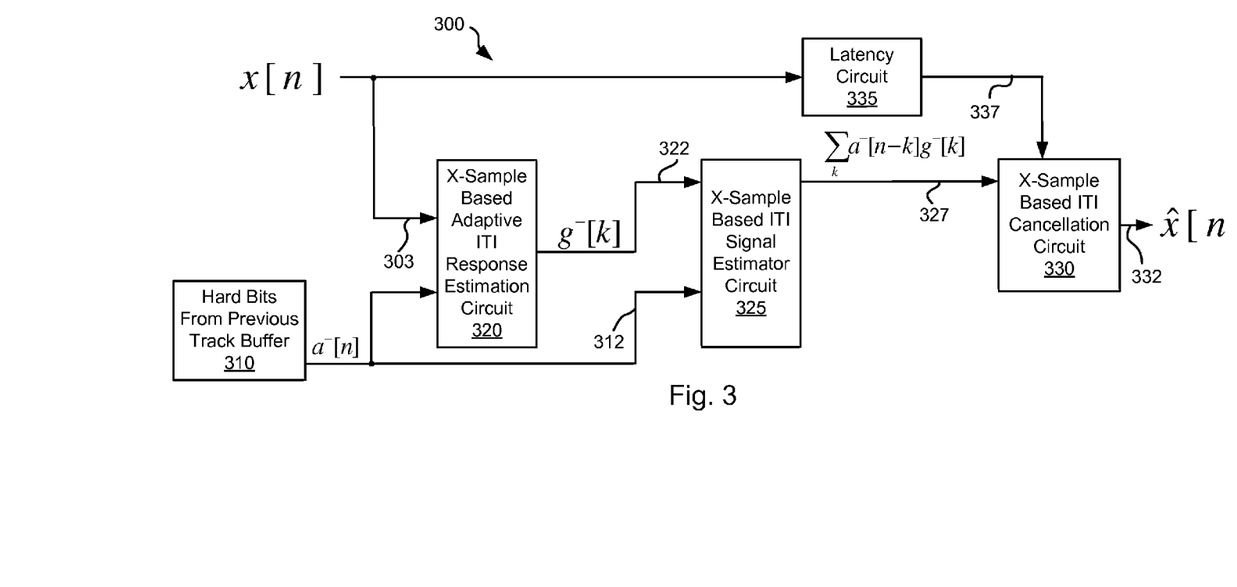
FIG. 3 shows an example implementation of an X-sample based ITI cancellation circuit that may be used in relation to the data processing circuit of FIG. 2.

Turning to FIG. 3, an example implementation of an X-sample based ITI cancellation circuit 300 that may be used in place of X-sample based ITI cancellation circuit 204 discussed above in relation to FIG. 2. As shown, X-sample based ITI cancellation circuit 300 receives an input 303 (x[n]), and provides an output 332 ($\hat{x}[n]$). When X-sample based ITI cancellation circuit 300 is used in place of X-sample based ITI cancellation circuit 204, input 303 corresponds to processing samples 209, and output 332 corresponds to corrected output 206.

Where inter-track interference is not a concern (i.e., the tracks are separated by substantial distance), discrete-time version of the input 303 is represented by the following equation:

$$x[n] = \sum_k a_0[n-k]g_0[k],$$

where $a_0$ is the hard decisions from the current track, and $g_0$ is the analog to digital converter target for the current track. In contrast, where inter-track interference is a concern due to proximity of tracks, input 303 is represented by the following equation:

$$x[n] = \sum_k a_0[n-k]g_0[k] + \sum_k a^-[n-k]g^-[k],$$

where $a^-$ is the signal from an adjacent track received from a buffer 310 where they were stored during a previous processing period and provided as an output 312, and $g^-$ is the analog to digital converter target for the intertrack interference from the adjacent track.

Input 303 and output 312 are provided to an X-sample based adaptive inter-track interference response estimation circuit 320. X-sample based adaptive inter-track interference response estimation circuit 320 is operable to estimate an analog to digital converter target for the intertrack interference for the adjacent track ($g^-$) 322 by correlating input 303 with output 312 in accordance with the following equation:

$$g^-[k] = E\{x[n] \cdot a^-[n-k]\}.$$

Analog to digital converter target for the intertrack interference for the adjacent track ($g^-$) 322 is provided to an X-sample based inter-track interference estimator circuit 325 that estimates the inter-track interference based upon a combination of input 322 and output 312. In particular, the inter-track interference is estimated in accordance with the following equation:

$$\sum_k a^-[n-k]g^-[k].$$

The estimated inter-track interference is provided as an interference output 327 to an X-sample based inter-track interference cancellation circuit that subtracts interference output 327 from a latency adjusted x-sample 337 (x'[n]) to yield output 332 ($\hat{x}[n]$) in accordance with the following equation:

$$\hat{x}[n] = x'[n] - \sum_k a^-[n-k]g^-[k].$$

Latency adjusted x-sample 337 is provided by a latency circuit 335 that delays input 303 to align it with corresponding instances of interference output 327. It should be noted that X-sample based ITI cancellation circuit 300 is one implementation of an inter-track cancellation circuit that may be used in relation to different embodiments of the present invention, and that one of ordinary skill in the art will recognize other approaches to calculate and cancel inter-track interference in accordance with various embodiments of the present invention. As an example, the implementation discussed in relation to FIG. 3 may be modified to allow for inter-track interference cancellation using the data from the next track in addition to the data from the previous track maintained in buffer 310.

Figure 4A:
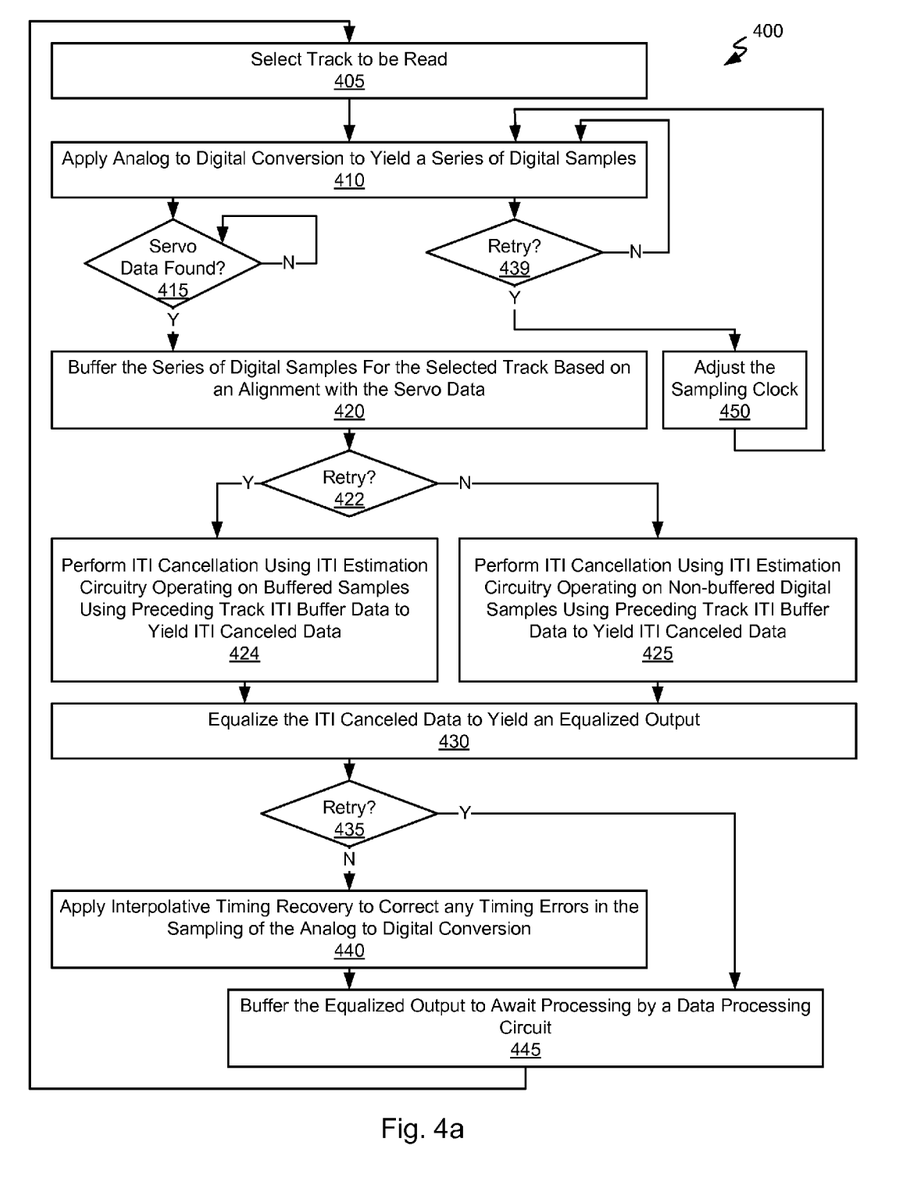
FIGS. 4a-4c are flow diagrams showing a method for data processing including X-sample based ITI cancellation in accordance with some embodiments of the present invention.
Figure 4B:
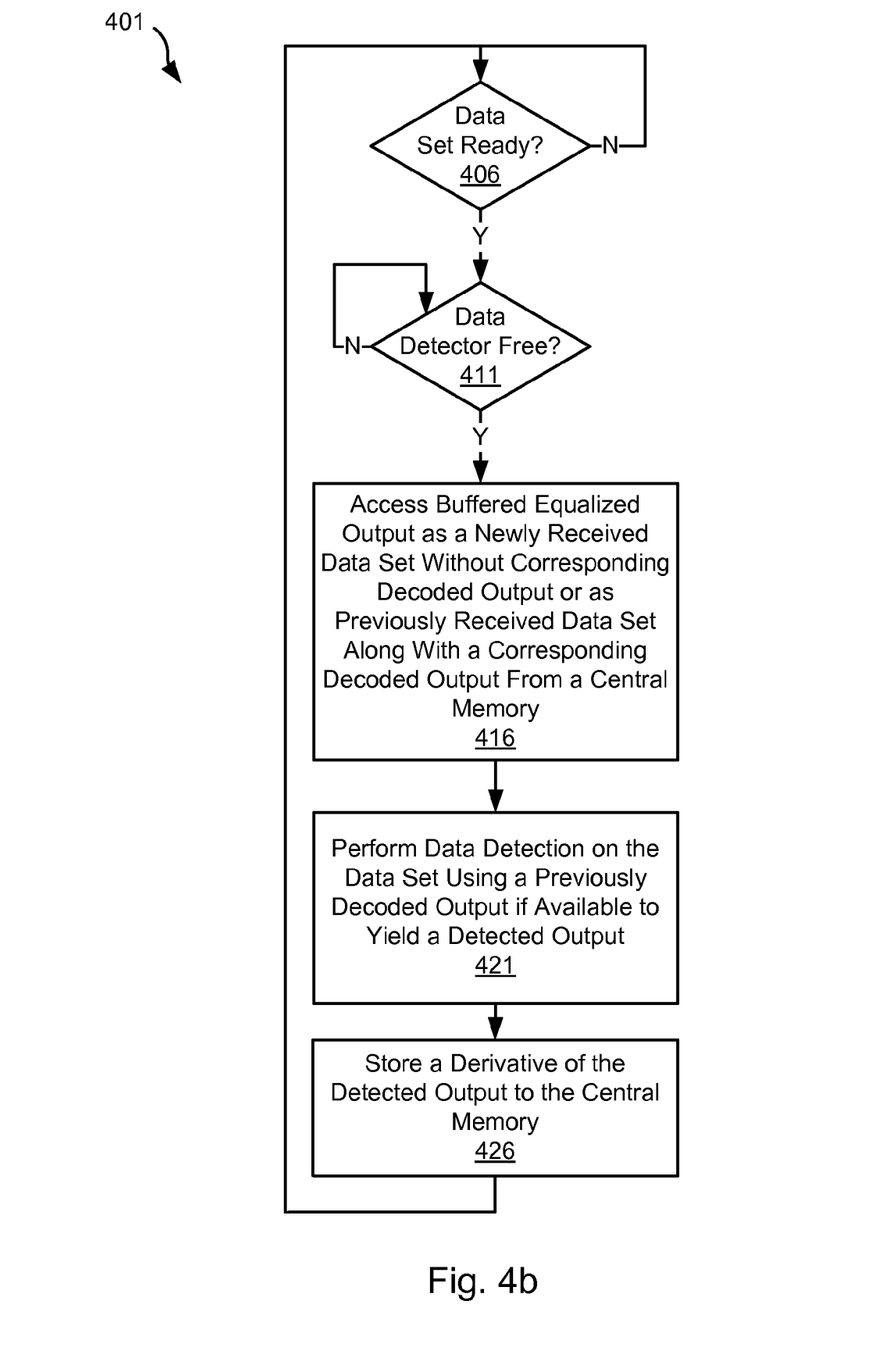
Figure 4C:
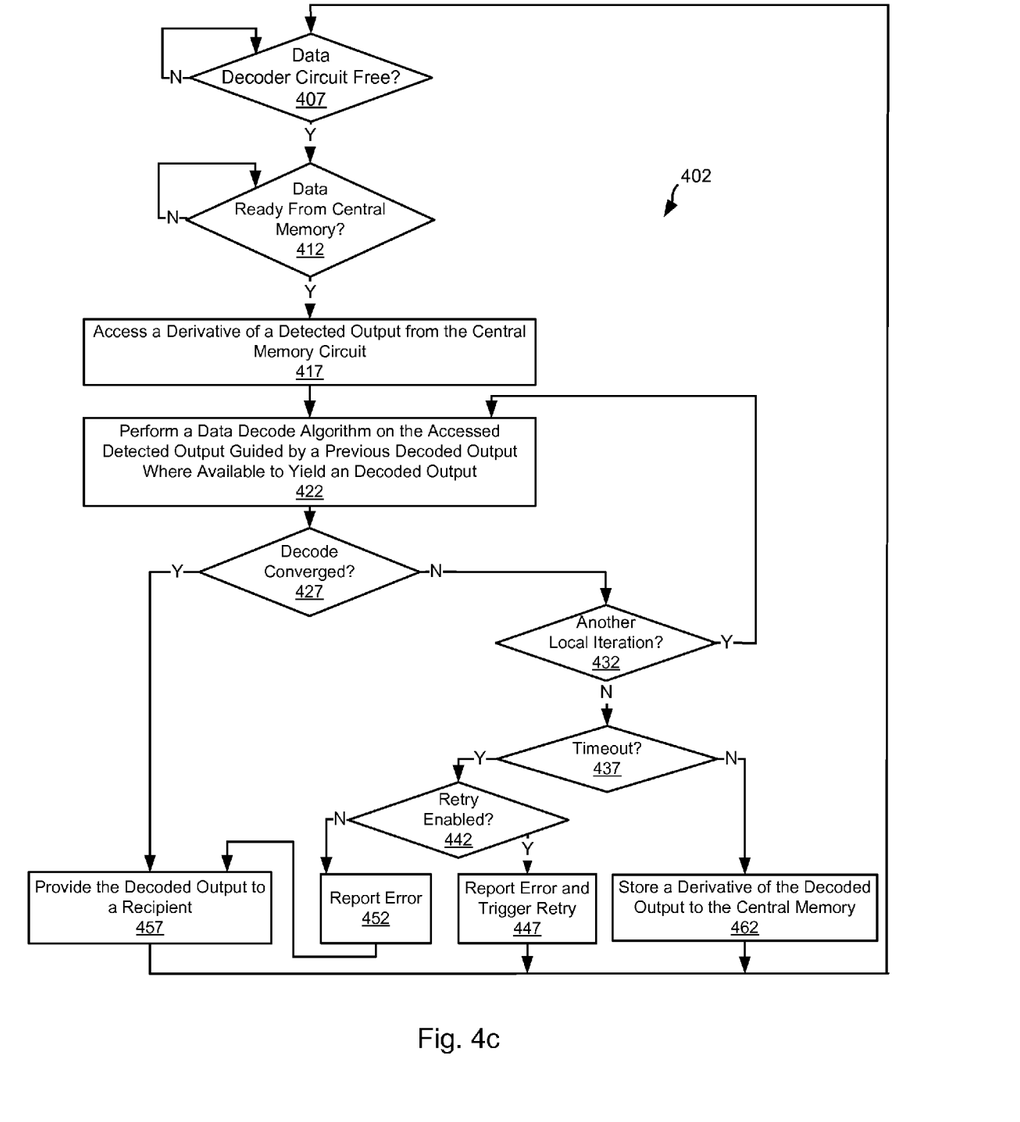

Turning to FIGS. 4a-4c, flow diagrams 400, 401, 402 show a method for data processing including X-sample based ITI cancellation in accordance with some embodiments of the present invention. Following flow diagram 400 of FIG. 4a, a track to be read is selected (block 405). In cases where only the previous track is to considered in canceling inter-track interference, the hard data (i.e. data bits) corresponding to the previous track have been loaded into an inter-track interference buffer (e.g., buffer 310 of FIG. 3). Thus, for example, where track N is selected for reading, a preceding track inter-track interference buffer holding the hard data corresponding to the track N−1 is loaded. It should be noted that the approach discussed in relation to FIG. 4 may be modified to allow for partial inter-track interference cancellation using only one side of the data. In such a case, the hard data corresponding only to the previous track have been loaded into the inter-track interference buffer corresponding to the previous track.

A read/write head assembly is positioned relative to the selected track and data sensed from the selected track is converted from the analog domain to a series of digital samples (block 410). It is determined whether a retry mode is ongoing (block 439). Where the retry mode is ongoing (block 439), the sampling clock is adjusted to correct for phase and frequency errors (block 450). The adjusted sampling clock is used during the analog to digital conversion (block 410). Alternatively, where the retry mode is not selected (block 439), the sampling clock is not adjusted and the analog to digital conversion process runs asynchronously (block 410).

In addition, the digital samples are queried to identify servo data (block 415). This process continues until servo data is found. When servo data is found (block 415), the servo data is processed to provide alignment information which can be used to access received data. The series of digital samples from the analog to digital conversion are aligned using the processed servo data (block 420). Where a retry mode is selected (block 422), inter-track interference cancellation is performed using inter-track interference estimation circuitry operating on buffered samples and using preceding track inter-track interference buffer data to yield inter-track interference canceled data (block 424). Alternatively, where a retry mode is not selected (block 422), inter-track interference cancellation is performed using inter-track interference estimation circuitry operating on non-buffered digital samples and using preceding track inter-track interference buffer data to yield inter-track interference canceled data (block 425). The inter-track interference estimation circuitry may be, for example, X-sample based ITI cancellation circuit 300 discussed above in relation to FIG. 3.

The inter-track interference canceled data is equalized to yield an equalized output (block 430). The equalization may be done, for example, using a digital finite impulse response circuit. Where the retry mode is not ongoing (block 435), interpolative timing recovery is applied to correct any timing errors in the sampling of the analog to digital conversion (block 440). The interpolative timing recovery interpolates between adjacent instances of the equalized output to correct for any phase error introduced by the asynchronous sampling applied by the analog to digital conversion process. This interpolation may be based upon, but is not limited to, identifying maximums and minimums in a repeating signal to yield a phase correction offset that is then applied to other non-repeating signals. The resulting equalized output (either from block 430 or from block 440) is buffered to await processing by a data processing circuit (block 445). Operation of the data processing circuit is more fully discussed in relation to FIGS. 4b-4c.

Turning to FIG. 4b and following flow diagram 401, it is determined whether a data set is ready for application of a data detection algorithm (block 406). In some cases, a data set is ready when it is received from a data decoder circuit via a central memory circuit. In other cases, a data set is ready for processing when it is first made available from a front end processing circuit such as that described in relation to flow diagram 400 of FIG. 4a. Where a data set is ready (block 406), it is determined whether a data detector circuit is available to process the data set (block 411).

Where the data detector circuit is available for processing (block 411), the data set is accessed by the available data detector circuit (block 416). The data detector circuit may be, for example, a Viterbi algorithm data detector circuit or a maximum a posteriori data detector circuit. Where the data set is a newly received data set (i.e., a first global iteration), only the newly received data set is accessed. In contrast, where the data set is a previously received data set (i.e., for the second or later global iterations), both the previously received data set and the corresponding decode data available from a preceding global iteration (available from a central memory) is accessed. The accessed data set is then processed by application of a data detection algorithm to the data set (block 421). Where the data set is a newly received data set (i.e., a first global iteration), it is processed without guidance from decode data available from a data decoder circuit. Alternatively, where the data set is a previously received data set (i.e., for the second or later global iterations), it is processed with guidance of corresponding decode data available from preceding global iterations. Application of the data detection algorithm yields a detected output. A derivative of the detected output is stored to the central memory (block 426). The derivative of the detected output may be, for example, an interleaved or shuffled version of the detected output.

Turning to FIG. 4c and following flow diagram 402, it is determined whether a data decoder circuit is available (block 407) in parallel to the previously described data detection process of FIG. 4b. The data decoder circuit may be, for example, a low density parity check decoding circuit. It is then determined whether a data set is ready from the central memory (block 412). The data set is a derivative of the detected output stored to the central memory as described above in relation to block 426 of FIG. 4b. Where a data set is available in the central memory (block 412), the previously stored derivative of a detected output is accessed from the central memory and used as a received codeword (block 417). A data decode algorithm is applied to the received codeword to yield a decoded output (block 422). Where a previous local iteration has been performed on the received codeword, the results of the previous local iteration (i.e., a previous decoded output) are used to guide application of the decode algorithm. It is then determined whether the decoded output converged (i.e., resulted in the originally written data) (block 427). Where the decoded output converged (block 427), it is provided as an output codeword to a recipient (block 457). Alternatively, where the decoded output failed to converge (block 427), it is determined whether another local iteration is desired (block 432). In some cases, ten local iterations are allowed per each global iteration. Based upon the disclosure provided herein, one of ordinary skill in the art will recognize another number of local iterations that may be used in relation to different embodiments of the present invention. Where another local iteration is desired (block 432), the processes of blocks 422-427 are repeated for the codeword. Alternatively, where another local iteration is not desired (block 432), it is determined whether a timeout condition has occurred (block 437).

A timeout condition may be, but is not limited to, a maximum number of global iterations that are allowed for a given data set. Where a timeout condition has not occurred (block 437), a derivative of the decoded output is stored to the central memory to await a future global iteration guided by the decoded output (block 462). Alternatively, where a timeout condition has occurred (block 437), it is determined whether a retry mode is possible and allowed (block 442). Such a retry mode allows for maintaining the data set for a later point or to re-read the data set at the later point when excess processing bandwidth is available. Where a retry mode is allowed (block 442), an error is reported and the retry mode is indicated for the data set (block 447). Indication of the retry mode governs the selection in blocks 422, 435, 439 of flow diagram 400 of FIG. 4a, and allows for re-processing of the data set during operation of the retry mode. Alternatively, where the retry mode is not allowed (block 442), an error is reported (block 452) and the decoded output is provided to a recipient (block 457).

Figure 5:
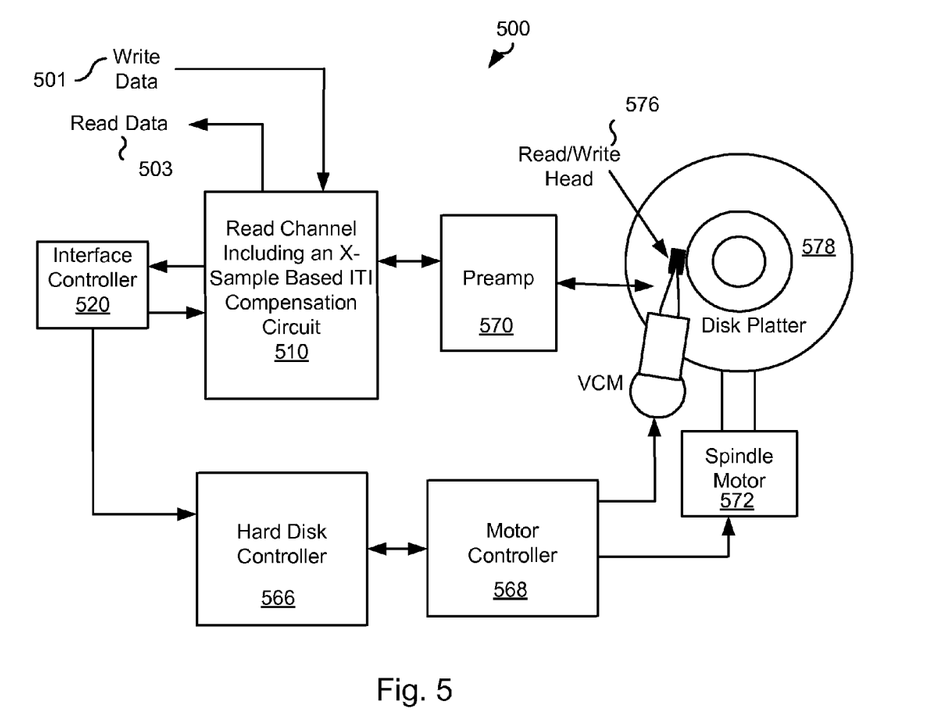
FIG. 5 shows a storage system with an inter-track interference compensation circuit in accordance with various embodiments of the present invention.

Turning to FIG. 5, a storage system 500 including a read channel circuit 510 with an X-sample based inter-track interference compensation circuit is shown in accordance with various embodiments of the present invention. Storage system 500 may be, for example, a hard disk drive. Storage system 500 also includes a preamplifier 570, an interface controller 520, a hard disk controller 566, a motor controller 568, a spindle motor 572, a disk platter 578, and a read/write head 576. Interface controller 520 controls addressing and timing of data to/from disk platter 578. The data on disk platter 578 consists of groups of magnetic signals that may be detected by read/write head assembly 576 when the assembly is properly positioned over disk platter 578. In one embodiment, disk platter 578 includes magnetic signals recorded in accordance with either a longitudinal or a perpendicular recording scheme.

In a typical read operation, read/write head assembly 576 is accurately positioned by motor controller 568 over a desired data track on disk platter 578. Motor controller 568 both positions read/write head assembly 576 in relation to disk platter 578 and drives spindle motor 572 by moving read/write head assembly to the proper data track on disk platter 578 under the direction of hard disk controller 566. Spindle motor 572 spins disk platter 578 at a determined spin rate (RPMs). Once read/write head assembly 578 is positioned adjacent the proper data track, magnetic signals representing data on disk platter 578 are sensed by read/write head assembly 576 as disk platter 578 is rotated by spindle motor 572. The sensed magnetic signals are provided as a continuous, minute analog signal representative of the magnetic data on disk platter 578. This minute analog signal is transferred from read/write head assembly 576 to read channel 510 via preamplifier 570. Preamplifier 570 is operable to amplify the minute analog signals accessed from disk platter 578. In turn, read channel circuit 510 decodes and digitizes the received analog signal to recreate the information originally written to disk platter 578. This data is provided as read data 503 to a receiving circuit. As part of processing the received information, read channel circuit 510 performs an inter-track interference compensation. Read channel circuit 510 may be implemented similar to that discussed above in relation to FIG. 2, and/or may operate similar to the method discussed in relation to FIGS. 4a-4c. A write operation is substantially the opposite of the preceding read operation with write data 501 being provided to read channel circuit 510. This data is then encoded and written to disk platter 578.

It should be noted that storage system 500 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such as storage system 500, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

A data decoder circuit used in relation to read channel circuit 510 may be, but is not limited to, a low density parity check (LDPC) decoder circuit as are known in the art. Such low density parity check technology is applicable to transmission of information over virtually any channel or storage of information on virtually any media. Transmission applications include, but are not limited to, optical fiber, radio frequency channels, wired or wireless local area networks, digital subscriber line technologies, wireless cellular, Ethernet over any medium such as copper or optical fiber, cable channels such as cable television, and Earth-satellite communications. Storage applications include, but are not limited to, hard disk drives, compact disks, digital video disks, magnetic tapes and memory devices such as DRAM, NAND flash, NOR flash, other non-volatile memories and solid state drives.

In addition, it should be noted that storage system 500 may be modified to include solid state memory that is used to store data in addition to the storage offered by disk platter 578. This solid state memory may be used in parallel to disk platter 578 to provide additional storage. In such a case, the solid state memory receives and provides information directly to read channel circuit 510. Alternatively, the solid state memory may be used as a cache where it offers faster access time than that offered by disk platted 578. In such a case, the solid state memory may be disposed between interface controller 520 and read channel circuit 510 where it operates as a pass through to disk platter 578 when requested data is not available in the solid state memory or when the solid state memory does not have sufficient storage to hold a newly written data set. Based upon the disclosure provided herein, one of ordinary skill in the art will recognize a variety of storage systems including both disk platter 578 and a solid state memory.

It should be noted that the various blocks discussed in the above application may be implemented in integrated circuits along with other functionality. Such integrated circuits may include all of the functions of a given block, system or circuit, or only a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for processing data from a storage medium. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data processing system, the data processing system comprising:
   an analog to digital converter circuit operable to convert an input data to a series of digital samples, wherein the input data corresponds to a first region on a storage medium;
   an inter-track interference compensation circuit operable to reduce inter-track interference in a data input to yield a corrected output, wherein the data input is derived from the series of digital samples, and wherein the inter-track interference corresponds at least in part to information at a second region on the storage medium;
   an equalizer circuit operable to equalize the corrected output to yield an equalized output;
   a data detector circuit operable to apply a data detection algorithm to a data detector input derived from the equalized output to yield a detected output;
   a data decoder circuit operable to apply a data decode algorithm to a decoder input to yield a decoded output, wherein the decoder input is derived from the detected output;
   a timing recovery circuit operable to phase shift the equalized output to yield a phase shifted output; and
   a selector circuit operable to select one of the equalized output or the phase shifted output as the data detector input.

2. The data processing system of claim 1, wherein the data detection algorithm is selected from a group consisting of: a maximum a posteriori data detection algorithm, and a Viterbi data detection algorithm.

3. The data processing system of claim 1, wherein the data decode algorithm is a low density parity check algorithm.

4. The data processing system of claim 1, wherein the selector circuit selects the equalized output as the data detector input when a retry mode is operating, and selects the phase shifted output when a standard mode is operating.

5. The data processing system of claim 1, wherein the data processing system further comprises:
   a sample buffer operable to store the digital samples as buffered samples; and
   a selector circuit, wherein the selector circuit is operable to select one of the digital samples or the buffered samples to be provided as the data input.

6. The data processing system of claim 5, wherein the selector circuit selects the digital samples as the data input when a standard mode is operating, and selects the buffered samples when a retry mode is operating.

7. The data processing system of claim 1, wherein the data processing system is implemented as part of an integrated circuit.

8. The data processing system of claim 1, wherein the data processing system is deployed as part of a hard disk drive.

9. The data processing system of claim 1, wherein the first region is a first track on the storage medium, wherein the second region is a second track on the storage medium, and wherein the first track is adjacent to the second track.

10. The data processing system of claim 1, wherein the data processing system further comprises:
    a sample control circuit operable to adjust a sampling clock based upon the digital samples to yield an updated sampling clock when a retry mode is selected, wherein the updated sampling clock controls sampling by the analog to digital converter circuit.

11. A method for data processing, the method comprising:
    receiving an analog input corresponding to a first region of a storage medium;
    converting the analog input into a series of digital samples using an analog to digital converter circuit;
    reducing an interference in a data input to yield a corrected output, wherein the data input is derived from the series of digital samples, and wherein the inter-track interference corresponds at least in part to information from a second region on the storage medium;
    equalizing the corrected output to yield an equalized output;
    applying a data detection algorithm to a data detector input derived from the equalized output to yield a detected output;
    applying a data decode algorithm to a decoder input to yield a decoded output, wherein the decoder input is derived from the detected output;
    interpolating the equalized output to correct a phase error to yield a phase adjusted output;
    selecting the equalized output as the data detector input when a standard mode is operating; and
    selecting the phase adjusted output as the data detector input when a retry mode is operating.

12. The method of claim 11, wherein the method further comprises:
    adjusting a sampling clock based upon the digital samples to yield an updated sampling clock when a retry mode is selected, wherein the updated sampling clock controls sampling of the analog input when converting the analog input into the series of digital samples.

13. The method of claim 11, wherein the method further comprises:
    buffering the digital samples to yield buffered samples;
    selecting the digital samples as the data input when a standard mode is operating; and
    selecting the buffered samples as the data input when a retry mode is operating.

14. A storage device, the storage device comprising:
    a storage medium including at least a first track and a second track, wherein the first track is adjacent the second track;
    a read/write head assembly disposed in relation to the storage medium;
    a read channel circuit operable to receive an information set from the storage medium via the read/write head assembly, wherein the information set corresponds to the first track, the read channel circuit including:
       a front end circuit operable to convert the information set to a current track data set;
       an analog to digital converter circuit operable to convert the current track data set to a series of digital samples;
       an inter-track interference compensation circuit operable to reduce inter-track interference in a data input to yield a corrected output, wherein the data input is derived from the series of digital samples, and wherein the inter-track interference corresponds at least in part to an information at the second track;
       an equalizer circuit operable to equalize the corrected output to yield an equalized output;

a data detector circuit operable to apply a data detection algorithm to a data detector input derived from the equalized output to yield a detected output;

a data decoder circuit operable to apply a data decode algorithm to a decoder input to yield a decoded output, wherein the decoder input is derived from the detected output;

a timing recovery circuit operable to phase shift the equalized output to yield a phase shifted output; and a selector circuit operable to select one of the equalized output or the phase shifted output as the data detector input.

15. The storage device of claim 14, wherein the read channel circuit further comprises:

a sample buffer operable to store the digital samples as buffered samples; and a selector circuit, wherein the selector circuit is operable to select one of the digital samples or the buffered samples to be provided as the data input.

16. The storage device of claim 14, wherein the data detection algorithm is selected from a group consisting of: a maximum a posteriori data detection algorithm, and a Viterbi data detection algorithm.

17. The storage device of claim 14, wherein the data decode algorithm is a low density parity check algorithm.

18. The storage device of claim 14, wherein the selector circuit selects the equalized output as the data detector input when a retry mode is operating, and selects the phase shifted output when a standard mode is operating.

19. The storage device of claim 14, wherein the read channel circuit is implemented as part of an integrated circuit.

20. The storage device of claim 14, wherein the first region is a first track on the storage medium, wherein the second region is a second track on the storage medium, and wherein the first track is adjacent to the second track.

* * * * *